May 16, 1961 H. ALLEN 2,984,254
PRESSURE RELIEF VALVES
Filed June 12, 1958 3 Sheets-Sheet 1
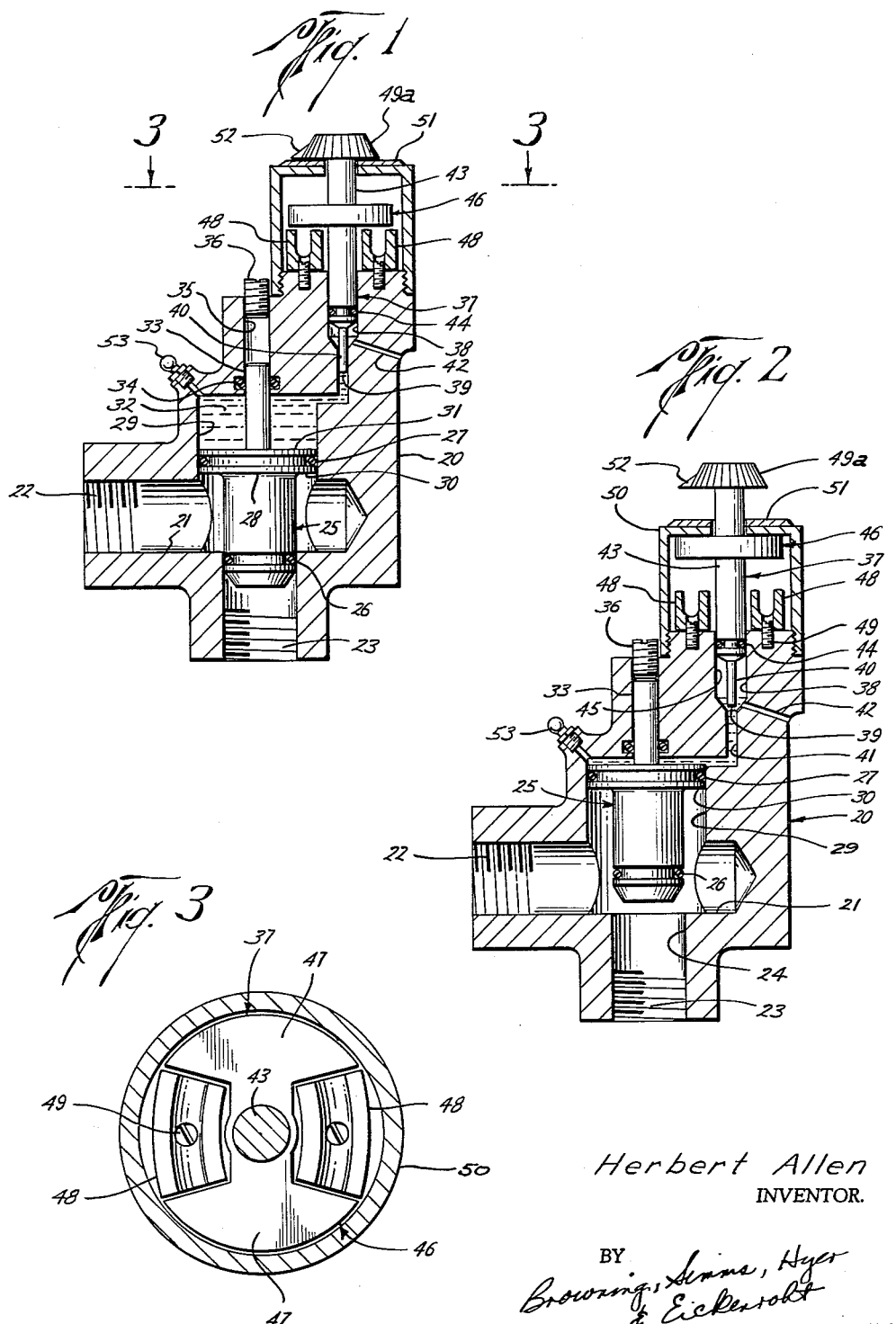
Herbert Allen
INVENTOR.
BY
Browning, Simms, Hyer
& Eickenroht
ATTORNEYS

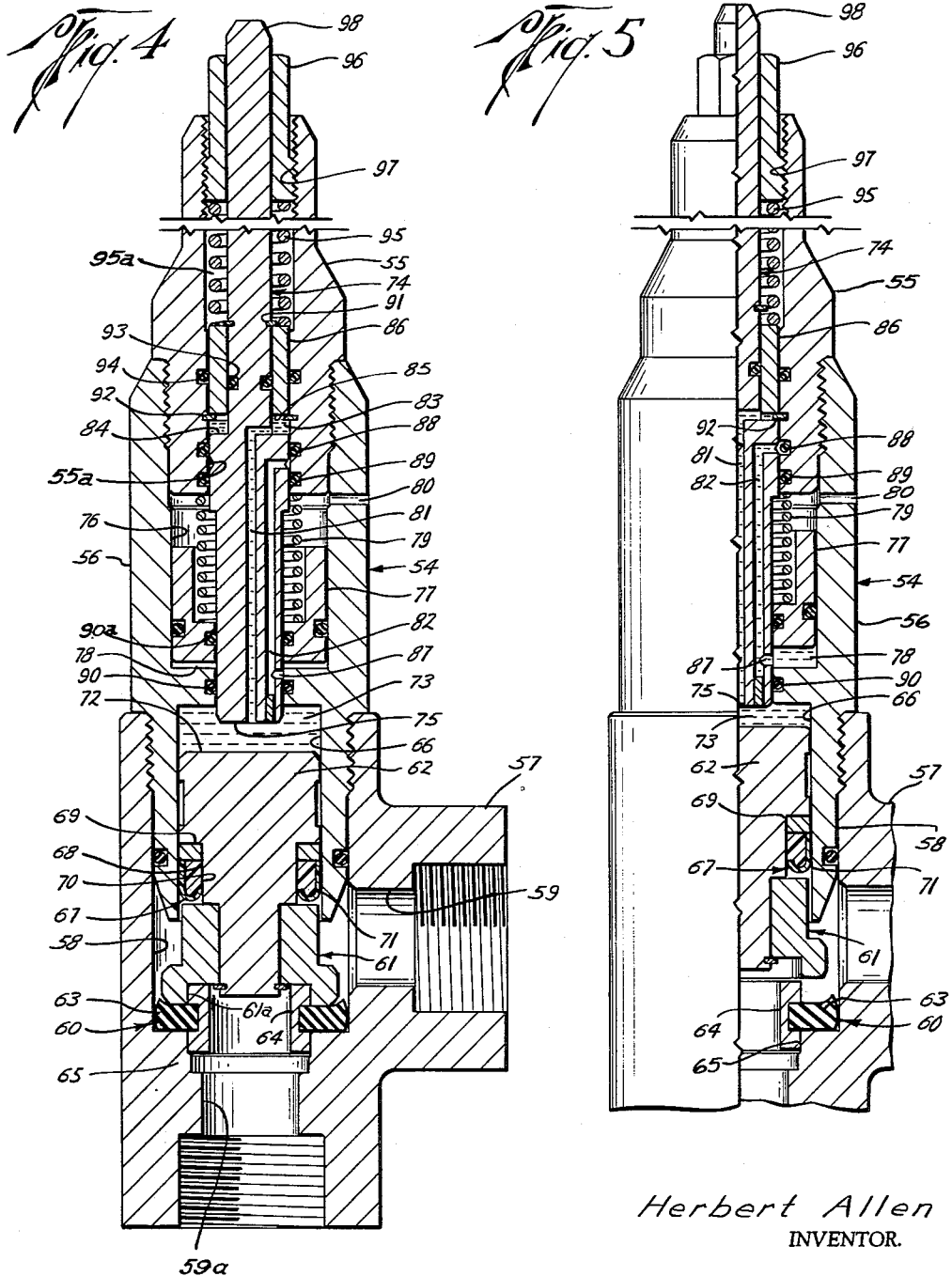

May 16, 1961 H. ALLEN 2,984,254
PRESSURE RELIEF VALVES
Filed June 12, 1958 3 Sheets-Sheet 3
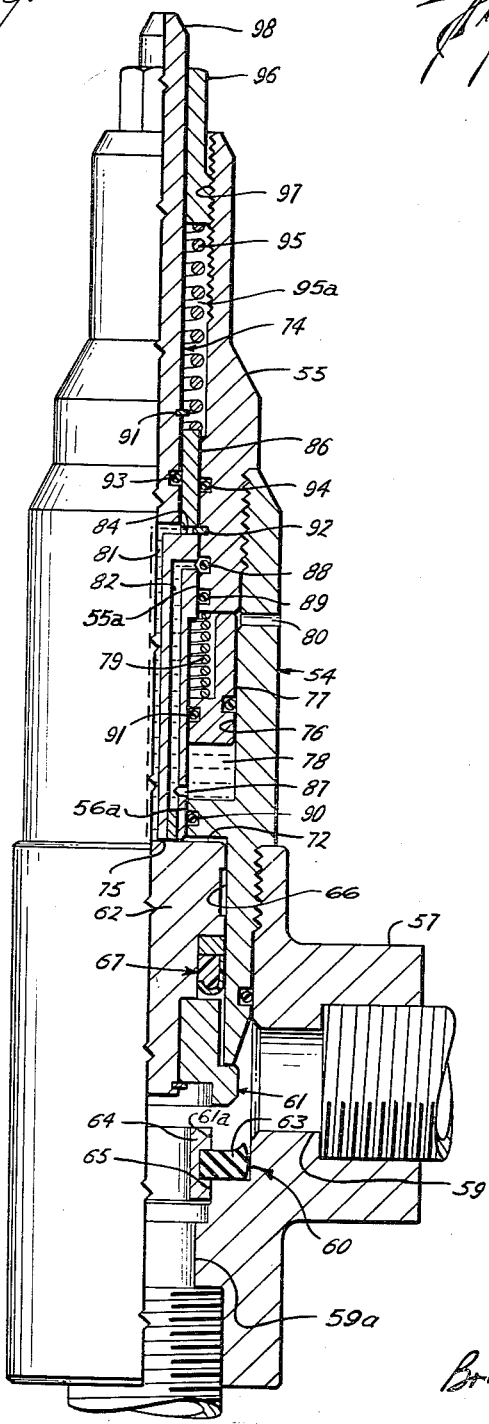
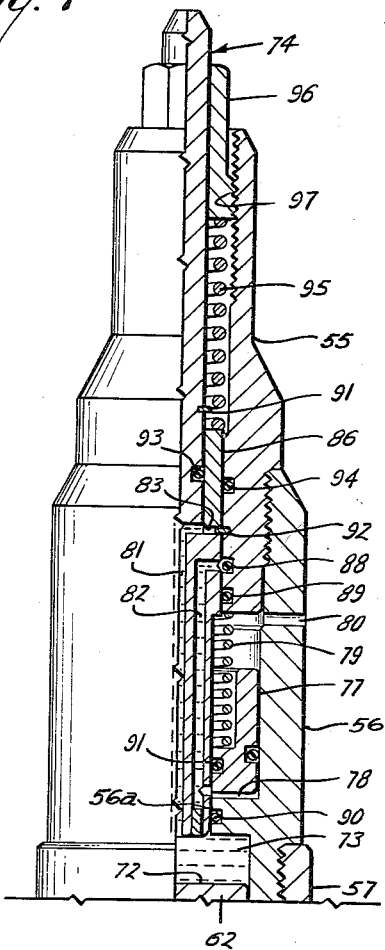
Herbert Allen
INVENTOR.
BY
Browning, Simms, Hyer
& Eickenroht
ATTORNEYS

United States Patent Office 2,984,254
Patented May 16, 1961

2,984,254

PRESSURE RELIEF VALVES

Herbert Allen, Houston, Tex., assignor to Cameron Iron Works, Inc., Houston, Tex.

Filed June 12, 1958, Ser. No. 741,636

18 Claims. (Cl. 137—467)

This invention relates generally to improvements in pressure relief valves of the type in which the force provided by the relief element for holding the valve member closed is adapted to be decreased at a very rapid rate when line pressure reaches the predetermined value to be relieved, such that the valve member is moved to a fully open position despite the sudden drop in line pressure as it is initially unseated.

In one valve of this type, the relief element has comprised one or more nails adapted to shear in response to the predetermined line pressure. However, when, in this particular valve as well as others of this type, very high pressures are to be relieved, the force to be overcome requires a relief element which is too large for all practical purposes. Also, an expendable part, such as a nail, requires replacement each time the valve relieves. Still further, earlier valves of this type have required special cushions or the like to dampen opening movement of the valve member.

An object of this invention is to provide a pressure relief valve in which the relief element need not be large, regardless of the pressure to be relieved, and in which the opening movement of the valve member is dampened without the need for special cushions or the like.

Another object is to provide a pressure relief valve of the type described in which such relief element need not be replaced upon each relief of the valve, and further in which such element may be reset for repeated operation with a minimum of effort.

A further object is to provide a pressure relief valve of the type described in which the effectiveness of such element is adjustable to relieve at different line pressures.

These and other objects are accomplished, in accordance with the present invention, by a pressure relief valve which comprises, as in prior valves of this type, a valve body having a flowway therethrough, and a valve member movable between positions opening and closing the flowway and having a pressure responsive surface exposed to the fluid within the flowway in the closed position thereof for urging the valve member toward its open position. A closed chamber in the body is formed in part by another pressure responsive surface on the valve member which is arranged to urge the valve member to its closed position, and a pilot member slidable within the valve body has a pressure responsive surface forming another part of the chamber which is of lesser area than the other pressure responsive surface of the valve member. The chamber is filled with liquid to hydraulically connect the pilot member to the valve member for moving said pilot member in one direction upon opening movement of said valve member.

A relief element provides a force effective to prevent movement of the pilot member in the one direction until the pressure of the fluid within the flowway reaches a predetermined value, and means are provided for venting the chamber in response to movement of the pilot member in said one direction. The relief element is ineffective to move the pilot member in the opposite direction upon venting of the chamber, whereby said chamber is contracted upon continued opening movement of the valve member.

The above-recited relationship of the hydraulically connected pressure responsive surfaces on the valve member and the pilot member enable the relief element to hold the valve member closed with a force which is proportionately smaller than the force exerted upon the valve member by the line fluid. Furthermore, the liquid within the closed chamber cushions opening movement of the valve member to a degree which may be controlled by the size of the venting means.

In accordance with further novel aspects of the present invention, means are provided both for admitting liquid to the contracted chamber to expand it for returning the valve member to closed position and for moving the pilot member in the opposite direction to a position in which the relief element is effective to prevent its movement in said one direction. Thus, the valve may be reset for repeated operaton with a minimum of effort. In this latter respect, the means for moving the pilot member comprises a part on said pilot member extending exteriorly of the valve member for manual resetting. In accordance with a still further novel aspect of the present invention, means are provided for adjusting the effectiveness of the relief element.

In one form of the invention, the pilot member is slidable within a guideway of the valve body, and the means for venting the closed chamber includes a port connecting the guideway with the exterior of the valve body and adapted to communicate the chamber with said body exterior responsive to movement of the pilot member in the one direction. Thus, the size of such port determines the rate of opening movement of the valve member. In this particular form of the invention, return of the pilot member to effective position prevents communication through the port between the chamber and exterior of the valve body, and a fitting is provided in the valve body for injecting liquid into the contracted chamber to expand it for returning the valve member to closed position upon the return of the pilot member to said effective position.

In a preferred form of the invention, however, the liquid filling the closed chamber is not lost upon venting of the latter, but, in fact, is used in returning the valve member to closed position. Thus, in this preferred form, there is a vent chamber in the valve body, and the venting means comprises means for connecting the closed chamber with the vent chamber in response to said movement of the pilot member in the one direction. More particularly, means are provided for returning the liquid from the vent chamber to the closed chamber automatically in response to a predetermined drop in the pressure of the line fluid. Such liquid returning means comprises a piston slidable within the body and having a pressure responsive surface forming part of the vent chamber, and means urging said piston in a direction to contract the vent chamber.

In one form of the invention, the relief element of the valve above described comprises an armature on one of said pilot member and valve body, and magnet pole pieces on the other end of said pilot member and valve body arranged opposite the armature to produce a magnetic attraction therebetween which is effective to prevent movement of the pilot member in said one direction until the pressure of the fluid within the flowway reaches the predetermined value. More particularly, the armature and pole pieces are movable apart, upon movement of the pilot member in said one direction, to render the magnetic attraction therebetween ineffective to move the pilot member in the opposite direction upon venting of the chamber so that, as previously described, the chamber is contracted upon continued closing movement of the valve member. Obviously, in this form of the invention, the relief element need not be replaced upon each relief of the valve and, as above noted, is rendered effective merely upon resetting of the pilot member.

The armature and pole pieces are preferably rotatable with respect to one another to adjust the magnetic attraction therebetween. It is also preferred that the pole pieces be fixed to the valve body, and that the armature be carried by the pilot member, the latter having a part extending exteriorly of the valve body for manual rotation to permit adjustment of the magnetic attraction between the armature and pole pieces.

In another form suitable for use with a valve of the type above described, another chamber connects with the closed chamber and is formed between oppositely facing pressure responsive surfaces on the pilot member and a piston having a lost-motion connection with the pilot member for urging said pilot member in said one direction. A spring acts between the valve body and piston to urge the pilot member in an opposite direction with a force effective to prevent movement of the pilot member in said one direction until the pressure of the fluid within the flowway reaches the aforementioned value, and the connection between the piston and pilot member is ineffective to move the pilot member in the opposite direction upon venting of the chamber. Thus, as previously described, the closed chamber is contracted upon continued closing movement of the valve member. The effectiveness of the spring is adjustable by means of a nut threadedly connected to the valve body and bearing on one end of the spring. As in the previously described form, this relief element need not be replaced upon each venting and is rendered effective upon resetting of the pilot member.

In the drawings, wherein like reference characters are used throughout to designate like parts:

Fig. 1 is a longitudinal sectional view of the first-described form of the invention, with the valve member thereof in closed position;

Fig. 2 is a similar view of the first form, but with the valve member in an open position to relieve the line pressure within the valve;

Fig. 3 is an enlarged cross-sectional view of the relief element of the valve of Figs. 1 and 2, as seen along broken line 3—3 of Fig. 1;

Fig. 4 is a longitudinal sectional view of the preferred form of the invention, with the valve member thereof in closed position;

Fig. 5 is another view of the preferred form similar to Fig. 4, but during opening movement of the valve member to relieve the line pressure;

Fig. 6 is still another view of the preferred form similar to Figs. 4 and 5, but in which the valve member is in its fully opened position; and Fig. 7 is a sectional view of the upper portion of the valve of Figs. 4 to 6 with the valve member returned to closed position, but prior to resetting of the pilot member.

Referring now in more detail to the above-described drawings, the form of the valve shown in Figs. 1 to 3 comprises a valve body 20 having a flowway 21 therethrough, an inlet 22 to the flowway and an outlet 23 therefrom formed at approximately right angles to one another, and a seating surface 24 on the flowway intermediate the inlet and outlet. A valve member 25 having a seal ring 26 thereabout is movable within the valve body between a position in which the seal ring 26 seats within the seating surface 24 to close the flowway, as shown in Fig. 1, and another position in which such seal ring is withdrawn from the seating surface to open the flowway, as shown in Fig. 2.

The valve member 25 is also provided with another seal ring 27 about an enlarged diameter portion 28 thereon for sealably sliding within a cylindrical opening 29 of the valve body. Thus, the annular surface 30 on the front side of the enlarged diameter portion 28 of the valve member is exposed to line fluid within the flowway of the valve body in the closed position of the valve member so as to urge such valve member toward its open position. The surface 31 on the back side of such portion 28 forms part of a chamber 32 which is closed and filled with liquid, as indicated in Fig. 1, to urge the valve member toward its closed position.

The valve member 25 is also provided with a stem 33 which projects upwardly through the chamber for sealably sliding within a seal ring 34 carried within a guideway 35 in the valve body. The upper end of the guideway is closed by a plug 36 or the like which is adjustably located as to limit opening movement of the valve member by engaging with the upper end of the stem 33, as shown in Fig. 2.

A pilot member 37 is slidable within a guideway 38 in the valve body which connects at its lower end with the chamber 32, and has a pressure responsive surface 39 on its lower end which forms another part of the closed chamber 32. More particularly, the area of the pressure responsive surface 39 on the pilot member is considerably smaller than the area 31 on the valve member 25, such that the force transmitted to the pilot member by the liquid within the chamber 32 is only a fraction of that due to the line fluid acting upon the pressure responsive surface 30 of such valve member. Therefore, as previously described, the relief element which provides a force effective to prevent movement of the pilot member in a relieving direction may be quite small, even in the case of high pressures to be relieved.

More particularly, the pilot member 37 includes a reduced portion 40 on its lower end which is sealably slidable within a reduced portion 41 on the lower end of guideway 38, and a port 42 in the valve body connects the exterior thereof with the guideway above the reduced portion thereof. Thus, when the reduced portion 40 of the pilot member is withdrawn from the reduced portion 41 of the guideway, as shown in Fig. 2, the port 42 is adapted to vent the chamber 32 to the exterior of the valve body and permit liquid to be discharged therefrom at a rate dependent upon the size of the port 42. Preferably, this port is of reduced size, as shown in Figs. 1 and 2, so that the opening movement of the valve member is gradual. The enlarged upper portion 43 of the pilot member is provided with a seal ring 44 sealably slidable within the enlarged upper portion 45 of the guideway, thus confining the flow of liquid from the chamber 32 into the port 42.

An armature 46 is secured to the upper portion of the pilot member 37 above the guideway 38 in the valve body and includes a pair of diametrically opposed segments 47, as shown in Fig. 3. A pair of magnet pole pieces 48 are secured, as by bolts 49, to the top of the valve body on diametrically opposite sides of the upper portion 43 of the pilot member and beneath the armature 46 thereon. More particularly, these pole pieces 48 comprise horseshoe type permanent magnets having their poles facing oppositely to the bottom surface of the armature 46 so as to produce a magnetic attraction therebetween dependent upon their spacing.

As is well known, the magnetic attraction between such elements is inversely proportional to the square of the distance therebetween. Thus, the armature 46 is attracted to the magnet pole pieces 48 with a relatively large force in the closed position of the valve member, as shown in Fig. 1. More particularly, the armature and magnet pole pieces are so located relative to one another in this position as to prevent movement of the pilot member in an upward direction until the pressure of the line fluid within the valve body flowway reaches a predetermined value. At this time, the force of such fluid acting upon the pressure responsive surface 30 of the valve member 25, and transmitted to the pilot member 37 through the liquid within closed chamber 32, overcomes the magnetic attraction between the armature and pole pieces and the valve member and pilot member begin to move upwardly.

Since this upward movement of the pilot member moves the armature away from the magnet pole pieces, the force due to the magnetic attraction therebetween is quickly reduced. Due to the previously noted relation between the enlarged portion 28 on the valve member and the reduced lower portion 40 on the pilot member, the pilot member will move upwardly at a considerably greater speed than the valve member.

It will also be noted that the valve member travels a short distance, and the pilot member travels a considerably greater distance, before opening the flowway, such that there is a large reduction in the force urging the pilot member downwardly prior to the reduction in line pressure. Since the chamber 32 is vented during this initial stage of opening movement of the valve member, the force provided by such relief elements is ineffective to move the pilot member downwardly, and the liquid in the chamber 32 flows freely through the port 42 to vent same due to contraction of the chamber 32 upon continued upward or opening movement of the valve member.

The pilot member 37 is also rotatable within the guideway 38 so that the rotative position of the armature segments 47 may be adjusted with respect to the magnet pole pieces 48. This adjustment enables the magnetic attraction therebetween, for any given spacing, to be increased or decreased. Thus, in the relative rotative position of the armature and magnets shown in Fig. 3, this magnetic attraction is at a minimum. However, upon rotation of the armature 90° with respect to the magnet pole pieces, such magnetic attraction can be increased to a maximum.

As shown in Figs. 1 and 2, the upper end of the pilot member is provided with a knurled knob 49a which may be gripped for manually rotating the armature to a desired position. Preferably, the magnet pole pieces and armature are housed within a cover 50 connected to the top wall of the body, and a circular plate 51 is provided on the top of the cover 50 for cooperation with a pointer 52. The plate may be provided with a scale calibrated to the force to be relieved.

The valve body is also provided with suitable means, such as an Alemite fitting 53 or the like, for injecting liquid into the contracted chamber 32. Thus, when the reduced portion 40 of the pilot member is lowered into guideway portion 41 to prevent communication through the port 42 between the chamber 32 and exterior of the valve body, the injected liquid will expand said chamber from the contracted position of Fig. 2 so as to return the valve member to closed position, as shown in Fig. 1. As previously noted, the magnetic attraction between the armature and magnet pole pieces is relatively small in the positions thereof shown in Fig. 2. In fact, it is contemplated that this force would be ineffective to overcome the friction between the pilot member and guideway for lowering the pilot member. However, the upper end of the pilot member which extends exteriorly of the valve body enables it to be manually pushed downwardly to its original position. When the pilot member is so moved, the chamber 32 is closed, as noted above, and the armature 46 is returned to a position opposite the magnet pole pieces wherein it again provides a force effective to prevent movement of the pilot member in an upward direction until the line pressure within the valve reaches a predetermined value. More particularly, the armature 46 is located in its reset position by engagement of the lower side of knob 49a upon the top side of plate 51, as shown in Fig. 1.

As shown in Figs. 4 to 7, the preferred form of pressure relief valves of the present invention comprises a body 54 made up of three coaxially arranged and threadedly connected tubular members 55, 56 and 57. The lowermost tubular member 57 has a flowway 58 formed therein, an inlet and outlet 59 and 59a, respectively, connecting with the flowway at right angles to one another, and a seat 60 formed in the flowway intermediate the inlet and outlet. A valve member 61 including a central body 62 is movable within the valve body between a position in which its lower end is seated on seat 60 to close the flowway, as shown in Fig. 4, and another position lifted from such seat to open the flowway, as shown in Figs. 5 and 6. The seat 60 comprises an annular packing 63 held by a support ring 64 disposed within a counter-bored portion 65 of the flowway. As can be seen from the drawings, when the valve member is closed, its lower end engages the packing 63 to form a seal, and a counter-bored portion 61a of the valve member above such lower end fits closely about the outer diameter of support ring 64. The inner diameter of said ring is reduced with respect to inlet and outlet 59 and 59a of the valve body so that the seat is not lifted during opening and closing of the valve member.

The upper portion of the body of the valve member is reciprocable within a cylindrical opening 66 in the tubular member 56 of the valve body, and is provided with an annular packing 67 which sealably engages such opening to provide a closed chamber 73 in the body. More particularly, packing 67 is disposed within an annular recess 68 of the valve member body and includes an upper ring 69 of Teflon or other suitable sealing material, a lower ring 70 of softer sealing material, such as Hycar, and an outermost J-shaped covering member 71 of Teflon or other harder material.

The inner diameter of the counter-bored portion 61a of valve member is smaller than the outer diameter of the upper packing 67, such that, in the closed position thereof, the valve member 61 has an annular pressure responsive surface arranged to urge the valve member toward its open position due to the pressure of the line fluid entering the flowway through inlet 59.

The upper end of the valve member body 62 provides a pressure responsive surface 72 which forms part of the closed chamber 73 and is arranged to urge such valve member toward its closed position. A pilot member 74 is longitudinally and sealably slidable within guideways 55a and 56a in the tubular members 55 and 56, respectively, so that its lower end provides a pressure responsive surface 75 which forms another part of the closed chamber 73. More particularly, the closed chamber 73 is filled with liquid to hydraulically connect the pressure responsive surface 75 on the pilot member 74 with the pressure responsive surface 72 on the valve member 61. Furthermore, this surface on the pilot member is of lesser area than that on the valve member, such that, upon movement of the valve member toward open position, the pilot member is moved upwardly with a proportionately smaller force than the force acting upon the valve member.

The tubular member 56 of the valve body is also provided with a cylindrical opening 76 therein to form an annular space about the pilot member 74 which is closed at one end by a reduced portion of member 56 forming the guideway 56a and at the other end by a reduced portion of member 55 forming guideway 55a. An annular piston 77 is sealably slidable within this space to form a vent chamber 78 therein which is adapted to be connected to the closed chamber 73 in response to movement of the pilot member in an upward direction, as will be described more fully hereinafter. More particularly, the piston 77 is urged downwardly to contract the vent chamber 78 by means of a coil spring 79 acting between the upper end of the annular space and a rear surface of the piston 77. Also, the portion of the annular space on the rear side of the piston is vented to the atmosphere by means of a port 80.

The closed chamber 73 is adapted to be connected with the vent chamber 78 by means which includes conduits 81 and 82 formed in the pilot member 74. The first of these conduits intersects the surface 75 on the lower end of the pilot member 74 to connect the closed chamber 73 with another annular chamber 83 formed between oppositely facing pressure responsive surfaces 84 and 85 on the pilot member and an annular piston 86, respectively. As shown, this piston is received between a reduced upper portion of the pilot member 74 and the guideway 55a. The conduit 82, on the other hand, intersects at its upper end with the outer diameter of the pilot member beneath the other chamber 83, and at its lower end with the vent chamber 78 by means of a port 87.

As can be seen from Fig. 4, in the lowermost position of the valve member, the upper end of conduit 82 is disposed between longitudinally spaced apart seal rings 88 and 89 carried by the guideway 55a of tubular member 55 for sealing engagement with the outer diameter of the pilot member 74 during its reciprocation therein. Since the other chamber 83 is disposed above the rings, the conduits 81 and 82 are isolated from one another. However, upon upward movement of the pilot member in response to upward movement of the valve member, the upper end of the conduit 82 is moved above the sealing engagement of ring 88 with the outer diameter of the pilot member so as to communicate the conduits 81 and 82 through the chamber 83 and between the outer diameter of the pilot member and guideway 55a of the tubular member 55. It will also be seen that the lower portion of the pilot member is sealably slidable within a seal ring 90 carried by the guideway 56a for sealing engagement with the pilot member beneath the port 87, and that a seal ring 90a carried by the annular piston 77 is sealably engageable with the pilot member above such port, so that liquid flowing from the chamber 73 and conduit 81 into the conduit 82 is directed into the vent chamber 78 and against the force of spring 79; and liquid flowing from the chamber 78 and conduit 82 into the conduit 81 is directed into the chamber 73. The rate of opening and closing movement of the valve member is controlled by the size of the port 87 and the conduits connecting the chambers 73 and 78.

A spring 95 disposed in an annular space 95a in the body between the reduced upper portion of the pilot member and the tubular body member 55 acts between a screw 96 threadedly connected at 97 to such body member and the upper end of the piston 86 to urge the latter downwardly. On the other hand, in the closed position of the valve member, as shown in Fig. 4, and during its initial opening movement, the liquid filling the chamber 83 hydraulically connects the piston 86 to the pilot member, so that the spring 95 also urges the valve member downwardly. More particularly, the spring 95 is adjusted by the screw 96 to provide a force effective to prevent opening of the valve member until line pressure reaches a predetermined value. The piston 86 is held against longitudinal movement by means of retainer rings 91 and 92 on the pilot member and guideway 55a, respectively, and is sealably slidable between such parts by means of seal rings 93 and 94 carried thereby.

When the line pressure reaches the predetermined value, the valve member, pilot member and piston 86 are moved upwardly against the force of spring 95. After a small movement of the valve member, and a greater movement of the pilot member, the conduits 81 and 82 are communicated with one another to vent chamber 73. In this respect, it will also be noted that sliding of the counter-bored portion 61a of valve member over the outer diameter of ring 64 will prevent a large drop in line pressure during this initial opening movement of the valve member.

As the chamber 73 is vented, the pressure of the liquid within chamber 83 drops quickly, so that the force urging the valve member downwardly is quickly reduced. The spring 95 forces the piston 86 downwardly and the pilot member 74 is free to move upwardly into engagement with the retainer ring 92, as shown in Fig. 5. Since the spring is rendered ineffective to urge the pilot member downwardly, the chamber 73 is contracted upon continued opening movement of the valve member, as shown in Fig. 6. Of course, the contracting of chamber 73 will expand vent chamber 78 against the force of spring 79 which is relatively weak.

When the line pressure drops to a predetermined low value, the force acting upon the lower side of the valve member to urge it upwardly as well as frictional forces are overcome by the force of the spring 79 urging the piston 77 downwardly, so that the vent chamber 78 is contracted and the chamber 73 expanded to move the valve member downwardly to its closed position, as shown in Fig. 7. At this time, however, the intersection of conduit 82 with the outer diameter of the pilot member 74 is still above the sealing engagement of upper ring 88 with the pilot member. However, the valve is reset for another relief operation merely upon forcing the upper end 98 of the pilot member, which extends exteriorly through the screw 96, downwardly so that the aforementioned intersection of the upper end of conduit 82 is returned to its original position between the seal rings 88 and 89, as shown in Fig. 4.

As in the case of the first-described form of the invention, the relief element may be small since the force which it must provide need only oppose the force on the pilot member 74, which is only a fraction of the force upon the valve member due to the line pressure. Furthermore, and again as in the case of the first-described form of the invention, the opening movement of the valve member is dampened by the liquid which is vented from the chamber 73, such dampening effect being controlled by the size of the conduits connecting the chambers 73 and 78. Furthermore, in this preferred form of the invention, all of the liquid is retained during each relief operation, and the valve member is automatically returned to closed position, such that resetting of the valve requires merely that the pilot member be manually moved downwardly.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pressure relief valve, comprising a valve body having a flowway therethrough, a valve member movable between positions opening and closing the flowway and having a pressure responsive surface exposed to the fluid within the flowway in the closed position thereof for urging the valve member toward its open position, a closed chamber in the body formed in part by another pressure responsive surface on the valve member arranged to urge said valve member toward its closed position, a pilot member slidable within the valve body and having a pressure responsive surface forming another part of the chamber which is of lesser area than the other pressure responsive surface of the valve member, means sealing off said pressure responsive surfaces on the valve member from one another, liquid filling said chamber to hydraulically connect the pilot member to the valve member for moving the pilot member in one direction upon opening movement of said valve member, relief means providing a force effective to prevent movement of the pilot member in the one direction until the pressure of the fluid within the flowway reaches a predetermined value, and means responsive to movement of the pilot member in said one direction to a venting position for venting said chamber, said relief means being rendered ineffective to move said pilot member in the opposite direction when said pilot member has moved to said venting position, whereby said chamber is contracted upon continued opening movement of the valve member.

2. A pressure relief valve of the character defined in claim 1, including means for adjusting the effectiveness of said relief element.

3. A pressure relief valve of the character defined in claim 1, including means for admitting liquid to the contracted chamber to expand it for returning the valve member to closed position, and means for moving the pilot member in the opposite direction to a position in which the relief element is effective to prevent its movement in said one direction.

4. A pressure relief valve of the character defined in claim 3, wherein said means for moving the pilot member comprises a part on said pilot member extending exteriorly of the valve body.

5. A pressure relief valve, comprising a valve body having a flowway therethrough, a valve member movable between positions opening and closing the flowway and having a pressure responsive surface exposed to the fluid within the flowway in the closed position thereof for urging the valve member toward its open position, a closed chamber in the body formed in part by another pressure responsive surface on the valve member arranged to urge said valve member toward its closed position, a pilot member slidable within a guideway of the valve body and having a pressure responsive surface forming another part of the chamber which is of lesser area than the other pressure responsive surface of the valve member, means sealing off said pressure responsive surfaces on the valve member from one another, liquid filling said chamber to hydraulically connect the pilot member to the valve member for moving the pilot member in one direction upon opening movement of said valve member, relief means providing a force effective to prevent movement of the pilot member in the one direction until the pressure of the fluid within the flowway reaches a predetermined value, and means including a port connecting the guideway with the exterior of the valve body adapted to communicate the chamber with said body exterior to vent same in response to movement of the pilot member in said one direction to a venting position, said relief means being rendered ineffective to move said pilot member in the opposite direction when said pilot member has moved to said venting position whereby said chamber is contracted upon continued opening movement of the valve member.

6. A pressure relief valve of the character defined in claim 5, including means for moving the pilot member in the opposite direction to a position in which the relief element is effective to prevent its movement in said one direction and communication through the port between the chamber and body exterior is prevented, and a fitting in the valve body for injecting liquid into the contracted chamber to expand it for returning the valve member to closed position upon movement of the pilot member to effective position.

7. A pressure relief valve, comprising a valve body having a flowway therethrough, a valve member movable between positions opening and closing the flowway and having a pressure responsive surface exposed to the fluid within the flowway in the closed position thereof for urging the valve member toward its open position, a closed chamber in the body formed in part by another pressure responsive surface on the valve member arranged to urge said valve member toward its closed position, a pilot member slidable within the valve body and having a pressure responsive surface forming another part of the chamber which is of lesser area than the other pressure responsive surface of the valve member, means sealing off said pressure responsive surfaces on the valve member from one another, liquid filling said chamber to hydraulically connect the pilot member to the valve member for moving the pilot member in one direction upon opening movement of said valve member, relief means providing a force effective to prevent movement of the pilot member in the one direction until the pressure of the fluid within the flowway reaches a predetermined value, a vent chamber in the valve body, and means responsive to movement of the pilot member in said one direction to a venting position for connecting the closed chamber with the vent chamber to vent said closed chamber, said relief means being rendered ineffective to move said pilot member in the opposite direction when said pilot member has moved to said venting position, whereby liquid is forced from the closed chamber into the vent chamber upon continued opening movement of the valve member.

8. A pressure relief valve of the character defined in claim 7, including means for forcing liquid from said vent chamber into said closed chamber automatically in response to a predetermined drop in the pressure of the fluid within the flowway so as to return the valve member to closed position, and means for moving the pilot member in the opposite direction, upon return of said valve member, to a position in which the relief element is effective to prevent its movement in said one direction.

9. A pressure relief valve of the character defined in claim 8, wherein said liquid forcing means comprises a piston slidable within the body and having a pressure responsive surface forming part of said vent chamber, and means urging said piston in a direction to contract said vent chamber.

10. A pressure relief valve, comprising a valve body having a flowway therethrough, a valve member movable between positions opening and closing the flowway and having a pressure responsive surface exposed to the fluid within the flowway in the closed position thereof for urging the valve member toward its open position, a closed chamber in the body formed in part by another pressure responsive surface on the valve member arranged to urge said valve member toward its closed position, a pilot member slidable within the valve body and having a pressure responsive surface forming another part of the chamber which is of lesser area than the other pressure responsive surface of the valve member, means sealing off said pressure responsive surfaces on the valve member from one another, liquid filling said chamber to hydraulically connect the pilot member to the valve member for moving the pilot member in one direction upon opening movement of said valve member, an armature on one of said pilot member and valve body, magnet pole pieces on the other of said pilot member and valve body arranged opposite the armature to produce a magnetic attraction therebetween which is effective to prevent movement of the pilot member in said one direction until the pressure of the fluid within the flowway reaches a predetermined value, and means responsive to movement of the pilot member in one direction to a venting position for venting said chamber, said armature and pole pieces being movable apart, upon movement of the pilot member in said one direction, to render said magnetic attraction therebetween ineffective to move said pilot member in the opposite direction when said pilot member has moved to said venting position, whereby said chamber is contracted upon continued opening movement of the valve member.

11. A pressure relief valve of the character defined in claim 10, wherein said armature and pole pieces are rotatable with respect to one another to adjust the magnetic attraction therebetween.

12. A pressure relief valve of the character defined in claim 11, wherein the pole pieces are fixed to the valve body, and the armature is carried by the pilot member, said pilot member having a part extending exteriorly of the valve body for manual rotation.

13. A pressure relief valve, comprising a valve body having a flowway therethrough, a valve member movable between positions opening and closing the flowway and having a pressure responsive surface exposed to the fluid within the flowway in the closed position thereof for urging the valve member toward its open position, a closed chamber in the body formed in part by another pressure responsive surface on the valve member arranged to urge said valve member toward its closed position, a pilot member slidable within the valve body and having a pressure responsive surface forming another part of the chamber which is of lesser area than the other pressure responsive surface of the valve member, means sealing off said pressure responsive surfaces on the valve member from one another, liquid filling said chamber to hydraulically connect the pilot member to the valve member for moving the pilot member in one direction upon opening movement of said valve member, another chamber connected with said closed chamber and formed between oppositely facing pressure responsive surfaces on the pilot member and on a piston having a lost-motion connection with the pilot member for urging said member in said one direction, a spring acting between the valve body and piston to urge said piston member in an opposite direction with a force effective to prevent movement of the pilot member in said one direction until the pressure of the fluid within the flowway reaches a predetermined value, and means responsive to movement of the pilot member in one direction to a venting position for venting said chamber, the lost-motion connection between the piston and pilot member rendering the spring ineffective to move said pilot member in the opposite direction when said pilot member has moved to said venting position, whereby said closed chamber is contracted upon continued opening movement of the valve member.

14. A pressure relief valve of the character defined in claim 13, including a part threadedly connected to the valve body and bearing on one end of the spring to adjust the force thereof.

15. A pressure relief valve of the character defined in claim 13, including a vent chamber in the valve body, and wherein said venting means comprises means responsive to said movement of the pilot member in said one direction for connecting the closed chamber with the vent chamber, whereby liquid is forced from the closed chamber into the vent chamber upon said continued opening movement of the valve member.

16. A pressure relief valve of the character defined in claim 15, wherein said vent chamber is formed between the pilot member and valve body, and said connecting means comprises a conduit in the pilot member connecting the vent chamber with the exterior of the pilot member, and means sealing between the pilot member and valve body to prevent communication between the exterior connection of said conduit with said other chamber prior to movement of the pilot member in said one direction and permit such communication upon such movement.

17. A pressure relief valve of the character defined in claim 16, including another conduit in the pilot member connecting the closed chamber with said other chamber.

18. A pressure relief valve of the character defined in claim 15, including an annular piston slidable between the pilot member and valve body and having a pressure responsive surface forming part of the vent chamber, means urging said piston in a direction to contract said vent chamber for returning liquid to said closed chamber automatically in response to a predetermined drop in the pressure of the fluid within the flowway, and means for moving the pilot member in the opposite direction, upon expansion of said closed chamber, to a position in which the spring is effective to prevent its movement in said one direction.

References Cited in the file of this patent

UNITED STATES PATENTS

| | | |
|---|---|---|
| 953,260 | Dixon | Mar. 29, 1910 |
| 2,619,109 | Garrett | Nov. 25, 1952 |